(12) United States Patent
Doi

(10) Patent No.: US 7,835,552 B2
(45) Date of Patent: Nov. 16, 2010

(54) IMAGE CAPTURING APPARATUS AND FACE AREA EXTRACTION METHOD

(75) Inventor: Shunichiroh Doi, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 923 days.

(21) Appl. No.: 11/714,813

(22) Filed: Mar. 7, 2007

(65) Prior Publication Data
US 2007/0223820 A1 Sep. 27, 2007

(30) Foreign Application Priority Data
Mar. 15, 2006 (JP) ............................ P2006-071272

(51) Int. Cl.
*G06K 9/00* (2006.01)
(52) U.S. Cl. ........................ 382/118; 382/128; 382/159; 382/165; 382/170
(58) Field of Classification Search ................. 382/118, 382/128, 159, 165, 170
See application file for complete search history.

(56) References Cited

U.S. PATENT DOCUMENTS

| | | | |
|---|---|---|---|
| 6,798,921 B2 * | 9/2004 | Kinjo | 382/282 |
| 7,573,505 B2 * | 8/2009 | Kawaguchi et al. | 348/222.1 |
| 2003/0071908 A1 | 4/2003 | Sannoh et al. | |
| 2005/0231628 A1 | 10/2005 | Kawaguchi et al. | |

FOREIGN PATENT DOCUMENTS

| | | |
|---|---|---|
| JP | 2001-119622 A | 4/2001 |
| JP | 2003-107555 A | 4/2003 |
| JP | 2005-318554 A | 11/2005 |

* cited by examiner

*Primary Examiner*—Matthew C Bella
*Assistant Examiner*—Mike Rahmjoo
(74) *Attorney, Agent, or Firm*—Birch, Stewart, Kolasch, Birch, LLP

(57) ABSTRACT

When a comparison is made between each partial image in frame images output in a frame order from a solid-state image capturing element and plural types of face patterns 25, 26, which are prepared in advance, according to pattern matching to extract an area of a person face image existing in each frame image as a face candidate, the pattern matching is performed with limiting face patterns used in extracting a face candidate from a current frame image to face patterns, of the plural types of face patterns, used in extracting a face candidate from a preceding frame image (step S29).

14 Claims, 6 Drawing Sheets

IMAGE CAPTURING APPARATUS AND FACE AREA EXTRACTION METHOD

BACKGROUND OF THE INVENTION

1. Technical Field

The invention relates to an image capturing apparatus such as a digital video camera or a digital still camera and a face area extraction method and in particular to an image capturing apparatus and a face area extraction method for making it possible to enhance the detection accuracy of a face area in a captured image.

2. Description of the Related Art

A recent image capturing apparatus has installed functions of automatically performing focus processing of focusing on the face of a person and automatically performing exposure adjustment processing and white balance correction processing so as to capture the skin color of the face finely when a person on the background of a landscape is a subject.

For example, with a digital still camera, before a still image is captured, image capturing data input subsequently in a moving image state from a solid-state image capturing element is analyzed, thereby extracting the area where a face exists, and with the face area in focus, exposure adjustment and white balance correction are automatically executed so as to take a picture of the skin color of the face fine.

To extract a face area in a captured image, a pattern matching method and a skin color detection method are available.

The pattern matching method is a method wherein various face patterns such as a pattern of viewing the face of a human being from the front, a pattern of viewing the face of a human being from a side, a face pattern of an adjust, and a face pattern of an infant are retained in memory in an image capturing apparatus and are used to extract the image area matching any of the face patterns from the captured image according to pattern matching.

The skin color detection method is a method wherein a captured image of one screen is divided into 8×8=64 areas, for example, the hue in each division area is found based on the integration data of R (red) G (green) B (blue) for each division area, and it is determined that a face exists in the division area where the hue is a skin color.

To extract a face area, the face area needs to be extracted with good accuracy. If a face area is erroneously extracted, focus processing is performed by assuming that the portion which is not essentially a face is a face and therefore an image with the subject person out of focus (so-called out-of-focus picture) is captured and an exposure failure or a white balance failure occurs, resulting in unnatural color of the face of the subject person.

For example, in the pattern matching method, a leaf pattern in the background may match a face pattern depending on the condition of a light beam, leading to erroneous extraction. In the skin color detection method, an essential person face may be erroneously determined a face other than a person face as the lipstick color or the spectacle color confuses the determination or if a background image of a color resembling the skin color exists, it may be erroneously extracted as a face.

JP 2001-119622 A, JP 2003-107555 A (corresponding to US 2003/071908 A), and JP 2005-318554 A (corresponding to US 2005/231628 A) relate to the face area extraction methods:

To extract a face area according to the pattern matching method, if the number of the types of face pattern templates provided in an image capturing apparatus is increased and matching processing is performed while the relative enlargement ratio or reduction ratio to the image to be matched with each face pattern used in pattern matching is changed finely, the face area detection accuracy is improved. However, to do this, the computation processing load grows and a high-performance and expensive processor becomes necessary to perform matching processing in a short time.

To extract a face area according to the skin color detection method, the hue of each of division areas further smaller than 8×8=64 areas described above is found, whereby the face area detection accuracy is improved. However, to do this, as mentioned above, the computation processing load also grows and a high-performance and expensive processor becomes necessary to extract a face area in a short time.

SUMMARY OF THE INVENTION

The invention provides an image capturing apparatus and a face area extraction method capable of extracting a face area with high accuracy at high speed using hardware used with an already existing digital camera, etc., without the need for an expensive processing unit.

According to an aspect of the invention, an image capturing apparatus and a face area extraction method compare between each partial image in frame images output in a frame order from a solid-state image capturing element and plural types of face patterns, which are prepared in advance, according to pattern matching to extract an area of a person face image, which exists in the frame image, as a face candidate. The apparatus and the method include performing the pattern matching with limiting face patterns used in extracting a face candidate from a current frame image to face patterns, of the plural types of face patterns, used in extracting a face candidate from a preceding frame image.

Also, when photometric data of the current frame image changes relative to photometric data of the preceding frame image, the face candidate may be extracted from the current frame image using all of the plural types of face patterns. When the photometric data of the current frame image does not change, the face patterns used in extracting the face candidate from the current frame image may be limited to the face patterns used in extracting the face candidate from the preceding frame image.

Also, the pattern matching may be performed using a reduced image provided by reducing the frame image. The image in a partial area, which contains a region where the face candidate exists in the preceding frame image, may be cut out from the current frame image. The pattern matching may be performed using the image in the partial area larger than the reduced image of the preceding frame image.

Also, the apparatus and the method may further include: judging as to whether or not hue of the face candidate is a skin color; and determining that the face candidate is a true face area when it is judged that the hue of the face candidate is the skin color.

With the above configuration, a face area can be extracted at high speed and with high accuracy using already existing hardware without using expensive and high-performance hardware.

DETAILED DESCRIPTION OF EMBODIMENTS OF THE INVENTION

Referring now to the accompanying drawings, an exemplary embodiment of the invention will be described below.

Figure 1:
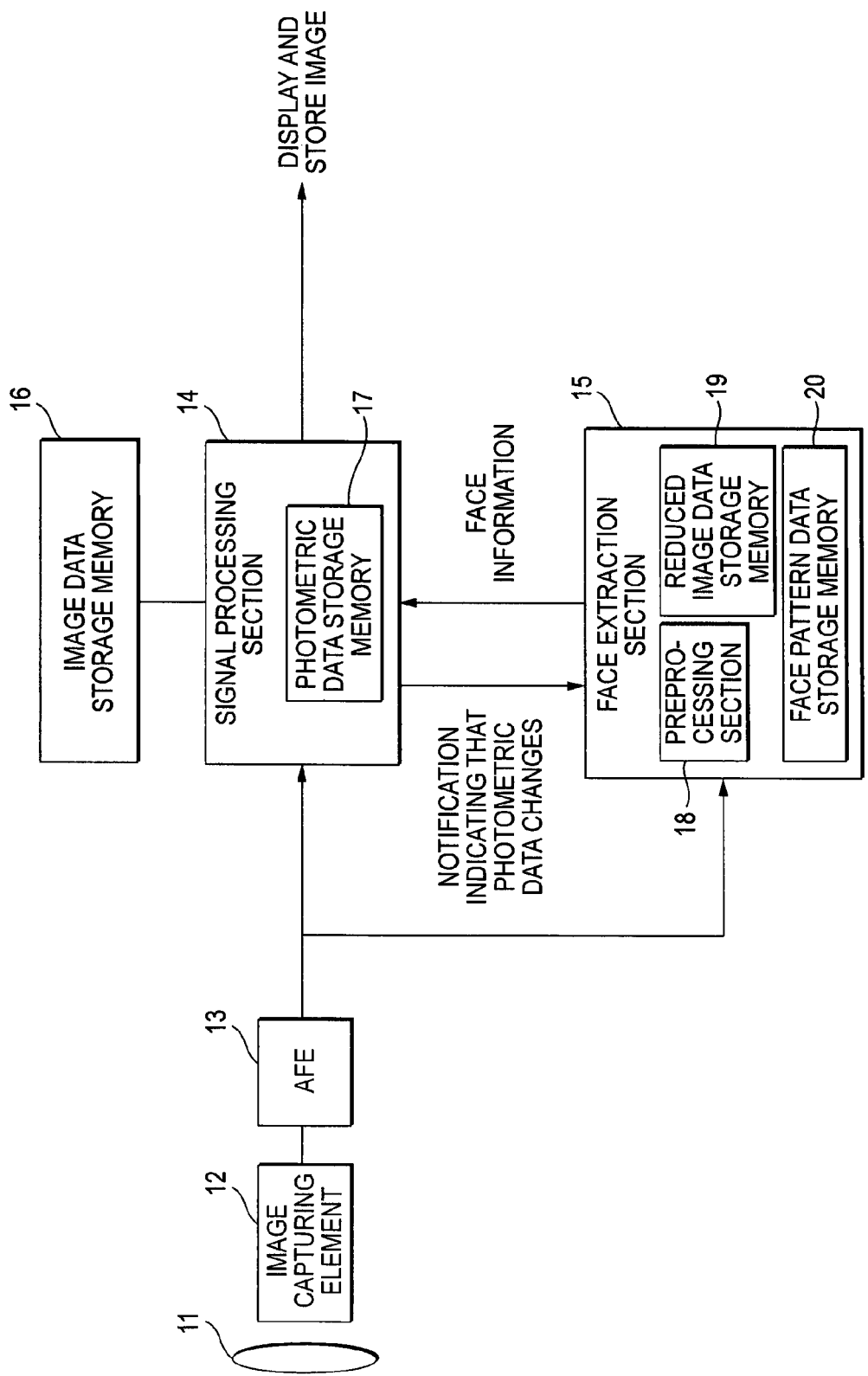
FIG. 1 is a functional block diagram of an image capturing apparatus according to one embodiment of the invention.

FIG. 1 is a functional block diagram of an image capturing apparatus according to one embodiment of the invention. The image capturing apparatus of the embodiment includes a image-capturing lens 11 for inputting incidence light from a field and forming an image, a solid-state image capturing element 12 such as a CCD image sensor or a CMOS image sensor with a light reception face placed on the image formation face of the incidence light, and an analog front end (AFE) processor 13 for performing correlated double sampling processing, gain adjustment processing, and analog-digital conversion processing of image data output from the solid-state image capturing element 12.

The image capturing apparatus further includes a signal processing section 14 and a face extraction section 15 for acquiring captured image data output from the analog front end processor 13 in parallel, and an image data storage memory 16 connected to the signal processing section 14. Face information extracted by the face extraction section 15 is output to the signal processing section 14. Also, information indicating that photometric data detected by the signal processing section changes is sent to the face extraction section 15.

The signal processing section 14, which includes internal photometric data storage memory 17, once stores the digital captured image data input from the analog front end processor 13 in the image data storage memory 16 and then performs various types of image processing.

For example, the signal processing section 14 performs offset processing, gamma correction processing, RGB/YC conversion processing, etc., for the captured image data and further outputs image data compressed to a JPEG image, etc., to a record medium (not shown) for retention and displays the image data on a liquid crystal display section (not shown) installed on the rear, etc., of the image capturing apparatus as a through image.

The signal processing section 14, which includes skin-color determination unit (not shown), divides the captured image data of one screen stored in the image data storage memory 16 into 8×8=64 areas, for example. The signal processing section 14 calculates an integration value of R (red signal), G (green signal), and B (blue signal) for each division area to find the hue of each division area, and stores the hue data, etc., in the photometric data storage memory 17 as photometric data. The signal processing section 14 judges as to whether or not the hue is a skin color.

The signal processing section 14 performs processing of extracting, as a face area, a face candidate that is judged a true face from among pieces of face candidate information sent from the face extraction section 15. The signal processing section 14 performs exposure adjustment, white balance correction, etc., based on the hue data, etc., of the extracted face area and further gives a control command of the focus position to the image-capturing lens 11.

The face extraction section 15 includes a preprocessing section 18 for performing thinning-out processing for the captured image data input from the analog front end processor 13 to generate reduced image data, a reduced image data storage memory 19 for storing the reduced image data, and a face pattern data storage memory 20 for storing various pieces of face pattern template data, which are prepared in advance. The face extraction section 15 sends the coordinate data of the face candidate detected in pattern matching processing to the signal processing section 14 as face information.

Figure 2:
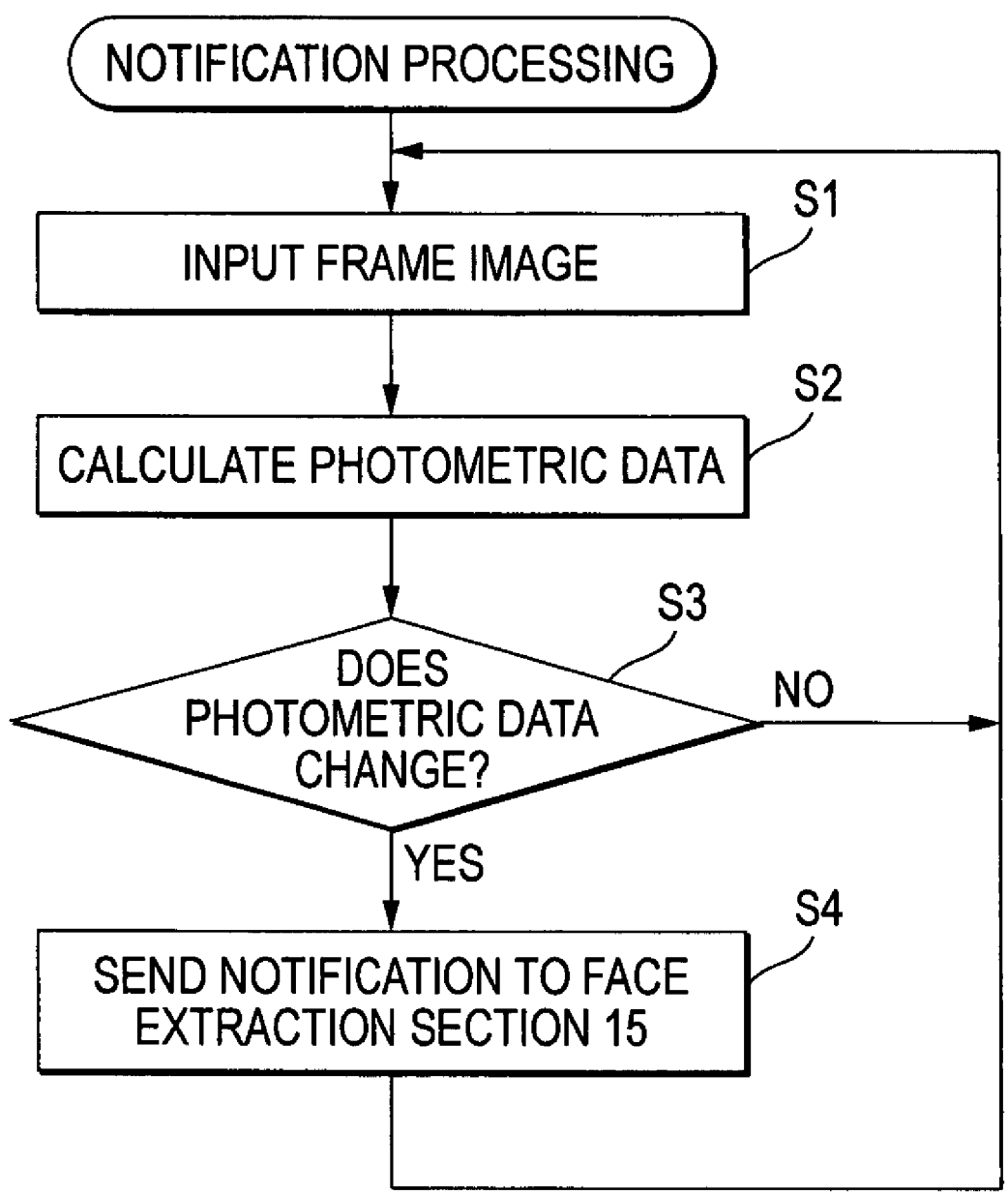
FIG. 2 is a flowchart to show a processing procedure executed by a signal processing section shown in FIG. 1, for notifying that photometric data changes.

FIG. 2 is a flowchart to show a processing procedure executed by the signal processing section 14, for notifies that photometric data changes. In the notification processing, the signal processing section 14 inputs frame images, which are output subsequently from the analog front end processor 13, in the frame order (step S1), calculates the above-described photometric data of the frame image (step S2), and stores the photometric data in the photometric data storage memory 17. Then, the signal processing section 14 judges as to whether or not the photometric data of the current frame image has change, which is equal to or larger than a predetermined threshold value, relative to the photometric data of the preceding frame image (step S3).

When the user points the image capturing apparatus at a subject and attempts to capture a still image, frame images are output subsequently from the solid-state image capturing element 12 even before the user presses a release button. The signal processing section 14 calculates the photometric data of each frame image. If the user changes pointing of the image capturing apparatus at the subject or the subject moves, the photometric data changes.

If it is judged at step S3 that the photometric data does not change, the process returns to step S1. If it is judged that the photometric data changes, the signal processing section 14 notifies that "the photometric data changes" to the face extraction section 15 (step S4) and then, the process returns to step S1.

Figure 3:
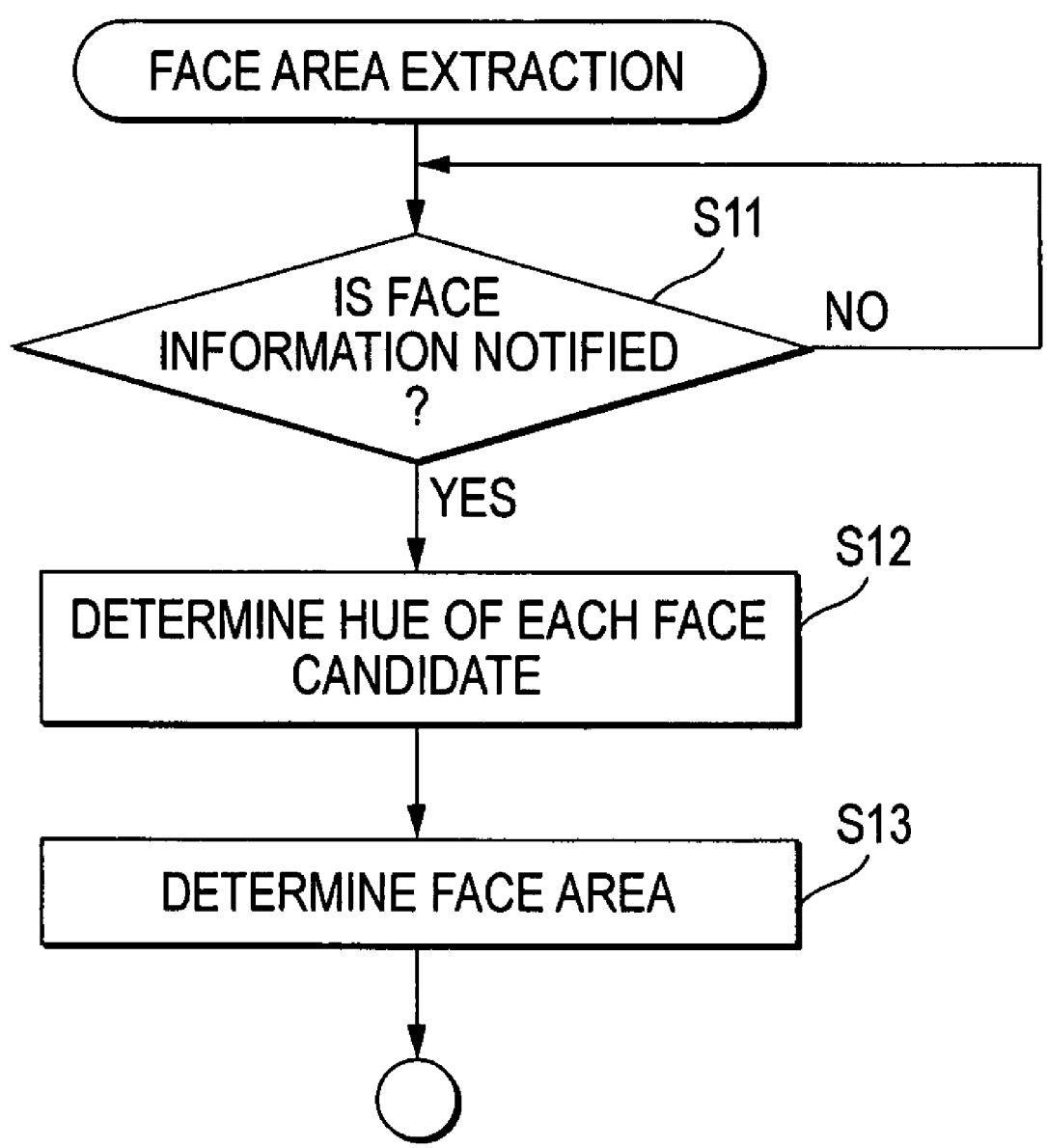
FIG. 3 is a flowchart to show a procedure of face area extraction processing executed by the signal processing section shown in FIG. 1.

FIG. 3 is a flowchart to show a procedure of the face area extraction processing performed by the signal processing section 14. In the face area extraction processing, the signal processing section 14 waits for reception of a notification of face information (face candidate) extracted by the face extraction section 15 in pattern matching processing (described later in detail) (step S11).

If receiving the notification of the face candidate, the signal processing section 14 goes to step S12, determines the hue of a division area (of 8×8=64 division areas) to which each face candidate belongs, based on the information stored in the photometric data storage memory 17 (step S12), determines that the face candidate whose the hue is a skin color is the true face area (step S13), and terminates the processing.

Figure 4:
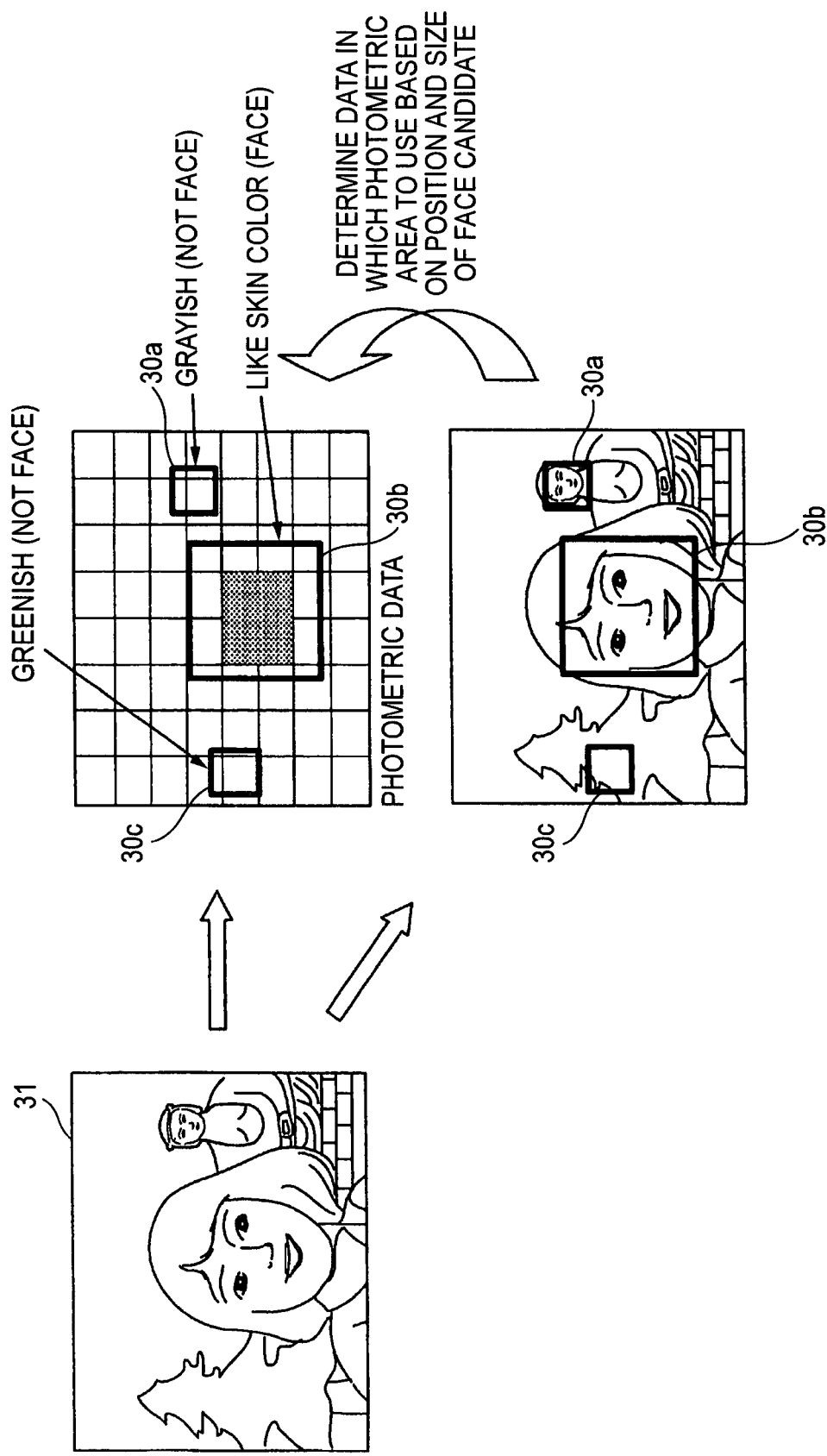
FIG. 4 is a view for supplementarily explaining the face area extraction processing shown in FIG. 3.

FIG. 4 is a view for explaining the face area extraction processing described with reference to FIG. 3. The face extraction section 15 performs the pattern matching processing (described later) for a captured frame image (reduced image in the memory 19) 31 to extract face candidates 30a, 30b and 30c and sends the extracted face candidates 30a, 30b and 30c to the signal processing section 14. In the example shown in FIG. 3, the face candidate 30a is the face of a statue of Buddha in the background, the face candidate 30b is the face of the person to be captured, and the face candidate 30c is a leaf pattern similar to a face pattern because of the condition of a light beam.

The signal processing section 14 calculates the photometric data for each of the 8×8=64 division areas and stores the photometric data in the memory 17. The skin-color determination unit of the signal processing section 14 determines the hue of each of division areas containing the face candidates 30a, 30b, and 30c and determines that the face candidate 30b indicating the hue of a skin color is the true face area.

In the example shown in FIG. 3, the face of the statue of Buddha (face candidate 30a) is a color like gray and thus is not determined a skin color. Also, the leaf pattern (face candidate 30c) is green and thus is not determined a skin color.

To use existing photometric area divided into a plurality of areas (8×8=64 division areas described above) as the photometric area of the image capturing apparatus, the face candidate area and the photometric area overlapping the face candidate area do not necessarily match. For example, the face candidate area 30b in FIG. 4 extends across four division areas and is smaller than the total range of the four division areas. Although the subject indicated by the true face candidate is a person face, if the photometric area contains any element other than the skin color (lipstick, etc.,), it may be impossible to show the precise hue.

To determine the face area based only on the skin color, the threshold value for determining skin color likeness from the hue value needs to be taken wider than the general skin color range, causing erroneous extraction to occur.

However, in the color skip detection method used in the face area extraction method of this embodiment, the face candidate is determined according to the pattern matching using the luminance component, so that it is sufficient to only determine as to whether or not the face candidate is like a person face or is false information resulting from pattern matching erroneous detection. It is not necessary to widen the hue range used in determining the skin color. Making hue determination in any area other than the face candidates is also eliminated.

Thus, the face area extraction method of this embodiment can reduce control failures (focus failure, exposure failure, white balance failure, etc.,) caused by erroneous detection of a face area without a cost increase simply by using already existing hardware.

Figure 5:
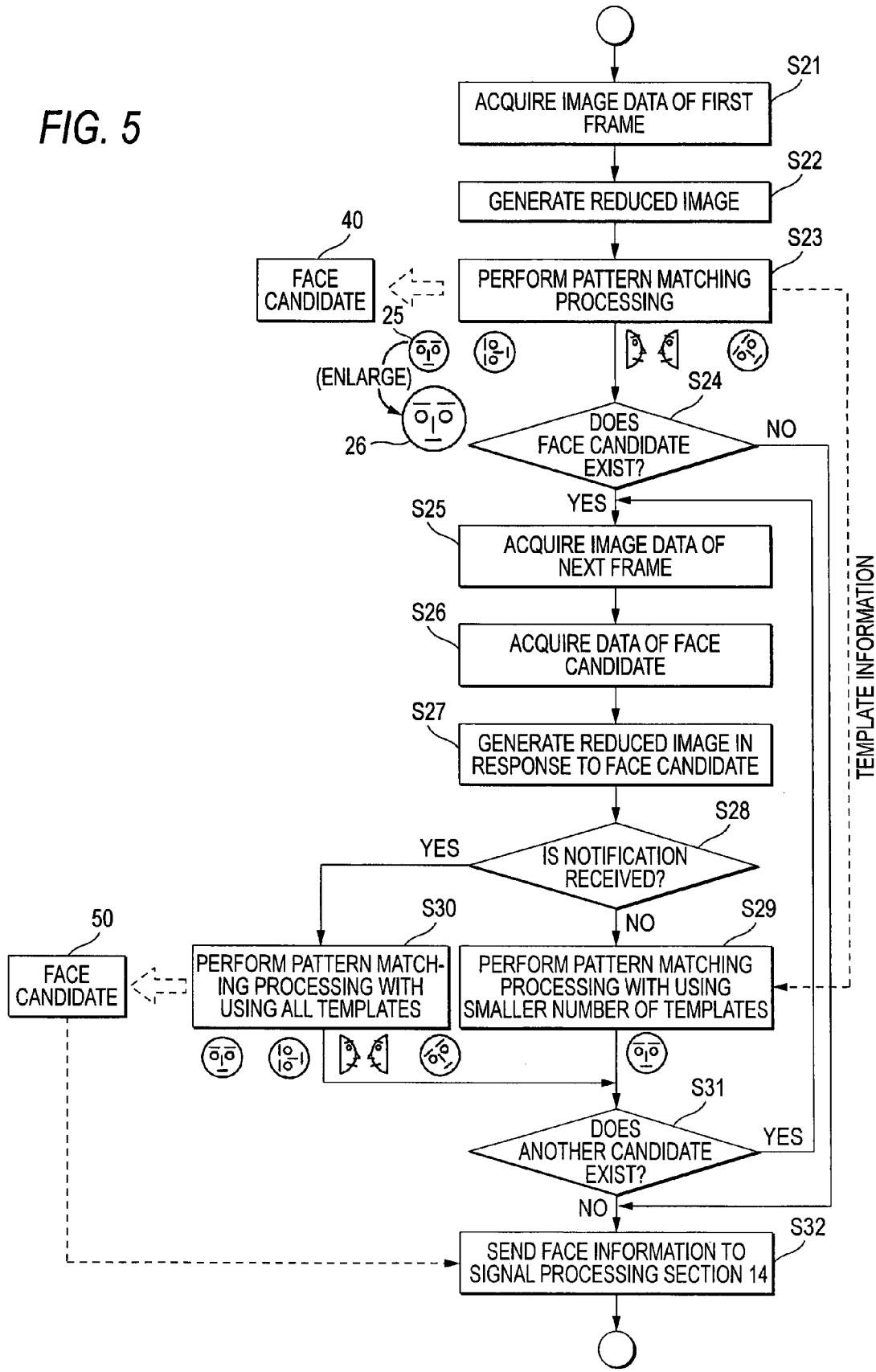
FIG. 5 is a flowchart to show a procedure of face candidate extraction processing executed by a face extraction section shown in FIG. 1.

FIG. 5 is a flowchart to show the procedure of the face candidate extraction processing according to the pattern matching processing performed by the face extraction section 15. Captured image data is output subsequently like a first frame image, a second frame image, a third frame image, . . . from the solid-state image capturing element 12.

The face extraction section 15 first acquires the captured image data of the first frame from the analog front end processor 13 at step S21. Then, the preprocessing section 18 generates reduced image data at step S22.

The reduction ratio of the reduced image data is set to a value to allow the captured image data to be stored in the reduced image data storage memory 19. The image capturing apparatus of this embodiment uses a memory installed in an existing digital camera as the reduced image data storage memory 19. Therefore, if the captured image data is captured image data output from a solid-state image capturing element installing millions of pixels or more, an image reduced at a considerable reduction ratio is stored in the memory 19.

At step S23, a face pattern template 25 to be used is taken out from the memory 20 and the pattern matching processing is performed. In the pattern matching processing, first the face pattern template 25 is scanned over the reduced image data 41 (see FIG. 6). It is determined as to whether or not similarity between the face pattern template 25 and a partial image in the reduced image data 41 is equal to or larger than a threshold value. The partial image having a similarity equal to or larger than the threshold value is adopted as a face candidate. The coordinates of the partial image in the reduced image data 41 are obtained and are stored in a first face candidate storage memory 40 (FIG. 5).

Upon completion of scanning the reduced image data 41 of one screen, then a face pattern 26 (FIG. 5) provided by enlarging (or reducing) the face pattern 25 at a predetermined scaling factor relative to the reduced image data 41 is generated and the enlarged face pattern 26 is scanned over the reduced image data 41 to perform the pattern matching processing again.

If there are a plurality of face pattern templates, which are prepared in advance, the above-described pattern matching processing is repeated using all face pattern templates and the coordinate data indicating obtained face candidates is stored in the memory 40.

Figure 6:
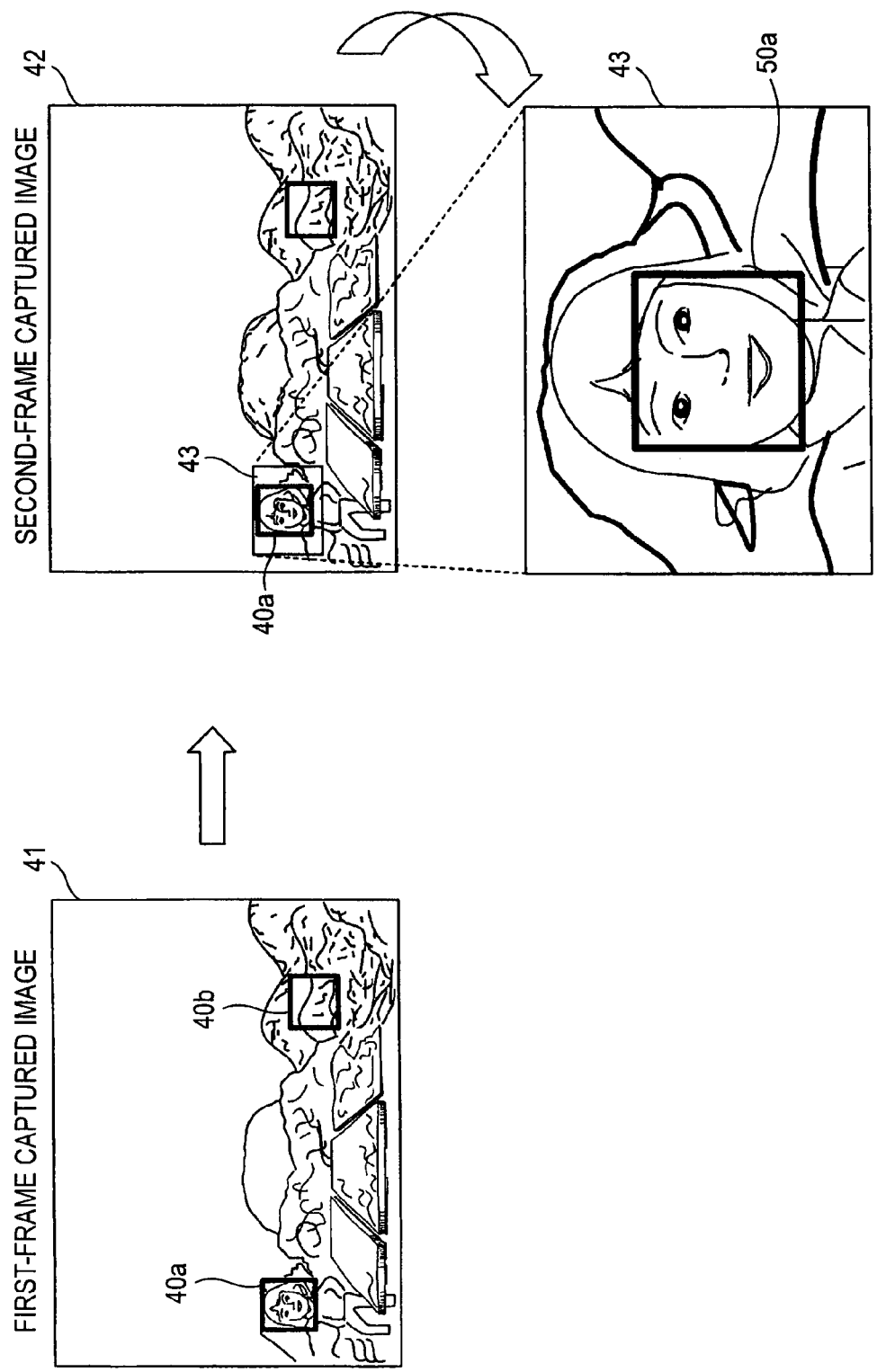
FIG. 6 is a view for supplementarily explaining the face candidate extraction processing shown in FIG. 5.

In the example shown in FIG. 6, face candidates surrounded by rectangular frames 40a and 40b are extracted. The face candidate 40a is a face candidate of the true person image. However, the face candidate 40b results from erroneous extraction of a leaf pattern as a face image. This is because the reduction ratio of the reduced image for pattern matching generated at step S22 is large.

At step S24, it is determined as to whether or not a face candidate is extracted at step S23. If no face candidate is extracted, the process goes to step S32 and a notification that a face candidate is not detected is sent to the signal processing section 14. Then, the processing is terminated.

In the example shown in FIG. 6, the face candidates 40a and 40b exist. Thus, it is determined at step S24 that a face candidate is detected. In this case, the process goes to step S25. The face extraction section 15 acquires the captured image data of the next frame (in this example, the second frame) from the AFE processor 13 and also acquires the data (coordinate data) of the first face area candidate 40a from the memory 40.

At step S27, as shown in FIG. 6, a partial area 43 a little wider (larger) than the existence range of the face area candidate 40a is cut out from a captured image 42 of the next frame. The image data in the partial area 43 is thinned out at a reduction ratio to allow the data to be stored in the image data storage memory 19 and is adopted as a pattern matching image. The enlargement ratio of the pattern matching image relative to the reduced image obtained at step S22 is found and is recorded.

At step S28, it is determined as to whether or not a notification indicating that the photometric data changes is received from the signal processing section 14. If a notification indicating that the photometric data changes is not received, the process goes to step S29 and the pattern matching processing is performed.

From the fact that the photometric data does not change, it can be determined that the view angles of the first frame image and that the second frame image are the same in the field angle as the first frame image and the subject does not move. This means that it is not necessary to use any other face pattern template than the face pattern templates, which have been used to extract the face candidates 40a and 40b and that if the face pattern templates, which have been used to extract the face candidates 40a and 40b, are used, face candidates can be extracted.

Then, in the pattern matching processing at step S29, matching processing is performed with using a face pattern template obtained by enlarging the face pattern template, which has been used to extract the face candidate 40a to the enlargement ratio recorded at step S27. If a face candidate cannot be extracted in the matching processing, the matching processing is repeated with the enlargement ratio changed little by little.

In the pattern matching processing at step S29, a search is made for a face candidate with using a pattern matching image larger than the reduced image generated at step S22, so that it is made possible to extract a face candidate 50a (see FIG. 6) with high accuracy. Moreover, since the number of templates to be used is limited, a face candidate can be extracted at high speed. The coordinate data of the extracted face candidate is stored in second face candidate memory 50 (FIG. 5).

If it is determined at step S28 that a notification indicating that the photometric data changes is received, the probability that the view angle may change or the subject may move is high. That is, it can be estimated that a difference occurs between the attitude of the person image in the preceding frame image and that in the current frame image. When change occurs in the attitude, if the number of face pattern templates to be used is limited as in the matching processing at step S29, a face candidate cannot be extracted.

Then, in this case, the process goes to step S30 and pattern matching processing is performed using all face pattern templates provided in the memory 20. Accordingly, it is made possible to extract a face candidate. The coordinate data of the extracted face candidate is stored in the second face candidate memory 50.

If a face candidate is extracted at step S29 or S30, then the process goes to step S31. It is determined as to whether or not another face candidate is left. If there is not another face candidate, the process goes to step S32. If another face candidate is left, the process returns to step S25.

In the example shown in FIG. 6, the face candidate 40b is left. Thus, the captured image in the next frame (in this example, the third frame) is input at step S25 and the coordinate data of the face candidate 40b is acquired at step S26. At step S27, an image in a partial area a little wider (larger) than the face candidate 40b is cut out from the captured image of the third frame and is thinned out. The resultant reduced image is stored in the reduced image data storage memory 19, and the enlargement ratio is also recorded.

At step S28, again it is determined as to whether or not a notification indicating that the photometric data changes is received. The process goes to step S29 or S30 depending on whether or not the notification indicating that the photometric data changes is received. If the process goes to step S29, the pattern matching processing is performed with using only the face pattern template, which has been used to extract the face candidate 40b. At step S30, the pattern matching processing is performed with using all the face pattern templates.

Since the face candidate 40b in this example shown in FIG. 6 is an erroneously extracted face candidate, a face candidate is not extracted at step S29 or S30.

Steps S25 to S31 described above are repeated and the coordinate data of the face candidate in the second face candidate memory 50 is sent to the signal processing section 14 as face information (step S32) and the face candidate extraction processing is terminated.

The signal processing section 14 uses the skin color determination method previously described with reference to FIG. 3 to extract the true face candidate as the face area from among the face candidates sent from the face extraction section 15. The signal processing section 14 executes focus processing, exposure amount adjustment, white balance correction processing, etc., based on the face area determined true. Accordingly, an image in focus on a person can be captured, so that the color of the person becomes a fine skin color.

As described above, according to the embodiment, although the demerit of loss of the synchronism between frames is suffered, the advantage that the face area detection accuracy can be improved using already existing hardware intact is provided. Since 30 frames of captured image are output per second from the solid-state image capturing element, if the synchronism between frames is lost, the time difference is small and the demerit except when an image of a person moving at high speed is captured is extremely small.

When the size of the face candidate obtained at step S23 is small, if extraction of a face candidate is again executed using a pattern matching image larger than the reduced image obtained at step S22, the face area detection accuracy improves.

However, if the face candidate obtained from the reduced image generated at step S22 has a measure of size or larger, the merit of detecting a face candidate using a larger pattern matching image (detectivity improvement) lessens.

Thus, if the size of the face candidate obtained at step S23 is larger than a predetermined threshold value, it is also possible to skip steps S24 to S31, send the face candidate to the signal processing section 14 as it is, and execute steps S24 to S31 only for a face candidate smaller than the predetermined threshold value.

According to the embodiment described above, a person face can be extracted at high speed and the detectivity of person faces can be enhanced using the hardware of an existing image capturing apparatus intact without using an expensive and high-performance apparatus.

Preferably, the image capturing apparatus of the embodiment described above is applied to a security camera used with a door phone system, etc., for example. In an apparatus intended for retaining video only when a person approaches like the door phone system (regardless of whether or not a visitor intends to press a button of the door phone from the purpose of the apparatus), it is made possible to precisely photograph the really necessary subject (person face) by reducing erroneous extraction of faces and improving the detectivity of person faces.

Since the face detectivity is high, the user can be saved from having to later checking endlessly captured images and further the person face is recognized and thus it is made possible to reliably photograph the face of a visitor as compared with the former recognition method using infrared radiation, etc. Further, since the detectivity of person faces is high, if a home-use security camera is used, retention of a captured image and transfer of a captured image to an external system can be stopped while a person face is not extracted, and power saving is also possible.

INDUSTRIAL APPLICABILITY

The face area extraction method according to the invention is useful for application to a digital camera, a security camera, etc., because it enables a face area to be extracted with high accuracy and at high speed using already existing hardware.

What is claimed is:

1. An image capturing apparatus for comparing between each partial image in frame images output in a frame order from a solid-state image capturing element and plural types of face patterns, which are prepared in advance, according to pattern matching to extract an area of a person face image, which exists in each frame image, as a face candidate, the image capturing apparatus comprising:

a face extraction unit that performs the pattern matching with limiting face patterns used in extracting a face candidate from a current frame image to face patterns, of the plural types of face patterns, used in extracting a face candidate from a preceding frame image, wherein when photometric data of the current frame image changes relative to photometric data of the preceding frame image, the face extraction unit extracts the face candidate from the current frame image using all of the plural types of face patterns, and when the photometric data of the current frame image does not change, the face extraction unit limits the face patterns used in extracting the face candidate from the current frame image to the face patterns used in extracting the face candidate from the preceding frame image.

2. The apparatus according to claim 1, wherein:

the face extraction unit performs the pattern matching using a reduced image provided by reducing the frame image, the face extraction unit cuts out an image in a partial area, which contains a region where the face candidate exists in the preceding frame image, from the current frame image, and the face extraction unit performs the pattern matching using the image in the partial area larger than the reduced image of the preceding frame image.

3. The apparatus according to claim 1, further comprising:

a skin-color determination unit that judges as to whether or not hue of the face candidate is a skin color, and determines that the face candidate is a true face area when judging that the hue of the face candidate is the skin color.

4. The apparatus according to claim 2, further comprising:

a skin-color determination unit that judges as to whether or not hue of the face candidate is a skin color, and determines that the face candidate is a true face area when judging that the hue of the face candidate is the skin color.

5. The apparatus according to claim 1, wherein:

the face extraction unit performs the pattern matching using a reduced image provided by reducing the frame image, the face extraction unit cuts out an image in a partial area, which contains a region where the face candidate exists in the preceding frame image, from the current frame image, and the face extraction unit performs the pattern matching using the image in the partial area larger than the reduced image of the preceding frame image.

6. The apparatus according to claim 5, further comprising:

a skin-color determination unit that judges as to whether or not hue of the face candidate is a skin color, and determines that the face candidate is a true face area when judging that the hue of the face candidate is the skin color.

7. The apparatus according to claim 1, further comprising:

a skin-color determination unit that judges as to whether or not hue of the face candidate is a skin color, and determines that the face candidate is a true face area when judging that the hue of the face candidate is the skin color.

8. A face area extraction method in an image capturing apparatus for comparing between each partial image in frame images output in a frame order from a solid-state image capturing element and plural types of face patterns, which are prepared in advance, according to pattern matching to extract an area of a person face image, which exists in the frame image, as a face candidate, the method comprising:

performing the pattern matching with limiting face patterns used in extracting a face candidate from a current frame image to face patterns, of the plural types of face patterns, used in extracting a face candidate from a preceding frame image, wherein when photometric data of the current frame image changes relative to photometric data of the preceding frame image, the face candidate is extracted from the current frame image using all of the plural types of face patterns, when the photometric data of the current frame image does not change, the face patterns used in extracting the face candidate from the current frame image are limited to the face patterns used in extracting the face candidate from the preceding frame image, and the pattern matching is performed by the image capturing apparatus.

9. The method according to claim 8, wherein:

the pattern matching is performed using a reduced image provided by reducing the frame image, an image in a partial area, which contains a region where the face candidate exists in the preceding frame image, is cut out from the current frame image, and the pattern matching is performed using the image in the partial area larger than the reduced image of the preceding frame image.

10. The method according to claim 9, further comprising:

judging as to whether or not hue of the face candidate is a skin color; and determining that the face candidate is a true face area when it is judged that the hue of the face candidate is the skin color.

11. The method according to claim 8, further comprising:

judging as to whether or not hue of the face candidate is a skin color; and determining that the face candidate is a true face area when it is judged that the hue of the face candidate is the skin color.

12. The method according to claim 8, wherein: the pattern matching is performed using a reduced image provided by reducing the frame image, an image in a partial area, which contains a region where the face candidate exists in the preceding frame image, is cut out from the current frame image, and the pattern matching is performed using the image in the partial area larger than the reduced image of the preceding frame image.

13. The method according to claim 12, further comprising:

judging as to whether or not hue of the face candidate is a skin color; and determining that the face candidate is a true face area when it is judged that the hue of the face candidate is the skin color.

14. The method according to claim 8, further comprising:

judging as to whether or not hue of the face candidate is a skin color; and determining that the face candidate is a true face area when it is judged that the hue of the face candidate is the skin color.

* * * * *